Aug. 26, 1969  A. QUENOT  3,463,416

BRAKE FOR LINEAR MEASURING INSTRUMENT HAVING A METALLIC TAPE

Filed Aug. 29, 1967  2 Sheets-Sheet 1

United States Patent Office 3,463,416
Patented Aug. 26, 1969

3,463,416
BRAKE FOR LINEAR MEASURING INSTRUMENT HAVING A METALLIC TAPE
André Quenot, Doubs, France, assignor to Quenot & Cie S.à.r.l., Doubs, France, a company of France
Filed Aug. 29, 1967, Ser. No. 664,026
Claims priority, application France, Jan. 6, 1967, 90,208
Int. Cl. B65h 75/16, 75/32, 59/16
U.S. Cl. 242—84.8                                  5 Claims

ABSTRACT OF THE DISCLOSURE

Brake for the metallic tape of a linear measuring instrument which brakes the last coil of the wound tape regardless of its state of unwinding. The brake can consist of at least one elastic branch centrally maintained and which is pre-curved to bear against this last coil.

---

Linear measuring instruments of the ten metre type comprise a tape which is often metallic and which can be extracted from a casing or frame by pulling on its extremity and which is rewound into the casing or frame by actuating the handle fast on the winding drum of the tape.

Owing to its flexibilty, the tape behaves practically like a spiral spring which is contracted when the tape is wound.

The interruption of the pulling exerted to unwind the tape frees the extremity thereof which, by this spring effect, tends to retract and occupy the space left free inside the casing or frame.

The springiness thus created is transmitted along a peripheral portion of the wound tape and/or often aids to rewind a part of the tape occasioning a freeing of a peripheral layer of wound coils which strike against the periphery of the casing or the frame or even a complete separation of all the wound coils from the winding drum.

Such happenings are contrary to a good use of the instrument since there occurs an unwanted rewinding of the tape. Additionally, to rewind the tape, the crank must be turned freely for several turns to compensate for the looseness of the coils in the case.

To eliminate these disadvantages, it has been suggested to provide the casing or the frame with a brake constituted by a flexible metallic strip the centre of which is secured on the shaft of the drum and the two free extremities of which bear on a flange of the casing on the frame at its periphery, the central part of the two branches of the strip being curved to bear on the edge of the wound coils of the tape.

This device has the disadvantage in that braking takes place only on the central part of the wound coils and not on the periphery. Moreover, the rubbing of the metallic edges of the tape on the strip which is also metallic causes rapid deterioration of the edge of the tape and of the protective enamel of the tape.

In order to prevent the abrupt rotation of the drum by traction of the tape tending to relax, the said drum has been braked by interposing on its rotating shaft a metallic elastic washer. In this manner there has been practically eliminated all danger of total withdrawal of the tape as a result of which the assembly of coils left the winding drum. However no suitable solution has yet been found to eliminate the unwanted expansion of the last coils of the tape.

Consequently the invention proposes to provide new braking means for the metallic tape of a linear measuring instrument which does not have the disadvantages of the known braking means.

To this effect, the invention is characterized in that the tape is braked on the last coils of its winding regardless of the extent of its unwinding.

The invention will be better understood by referring to the following description made by way of non-limiting example and to the accompanying drawing in which.

Figure 1:
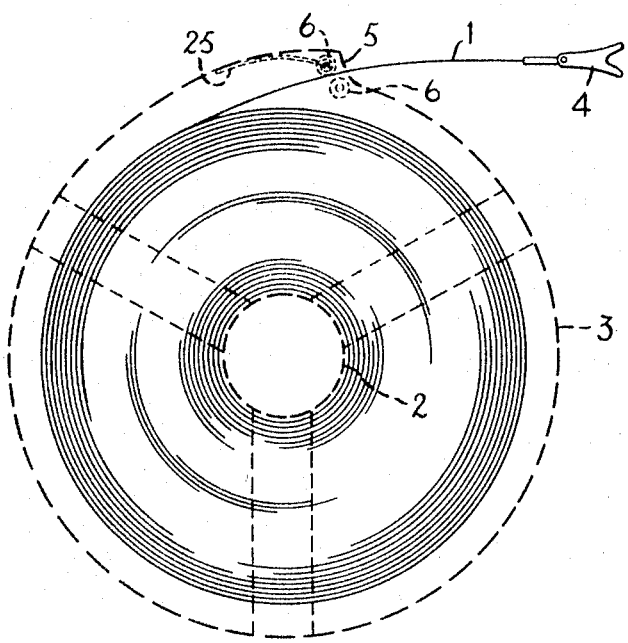
FIGURE 1 is a schematic view in longitudinal cross-section of an instrument according to the invention.

Reference is first made to FIGURE 1.

Tape 1 is wound on drum 2, the assembly being enclosed inside a casing or frame 3. Tape 1 is withdrawn from element 3 by pulling on its pull-out ring 4 and emerges from element 3 by its outlet 5.

In accordance with the invention, it is possible to brake 1 near its outlet 5 by device 6 bearing simultaneously on the two surfaces of tape 1. Device 6 can comprise two rollers or two shoes at least one of which bears elastically on the edge of the tape 1 through its spring blade. attachment 25 advantageously the rollers or shoes are of synthetic material.

Figure 2:
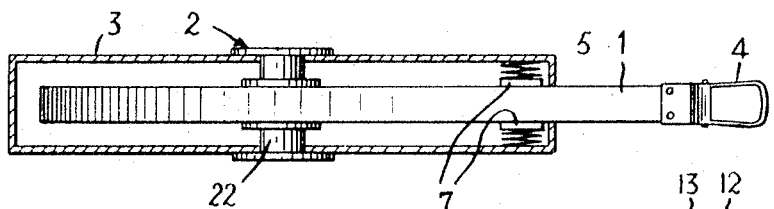
FIGURE 2 is a side view of a second embodiment of an instrument according to the invention.

FIGURE 2 shows another modification of the invention and the same references identify the same elements.

Tape 1, at outlet 5 of frame 3, is braked by device 7 which is able to bear on the edge of the tape from at least one side. Device 7 can consist of one or two shoes which bear elastically on the edge of tape 1. The shoes are advantageously of plastics.

Figure 3:
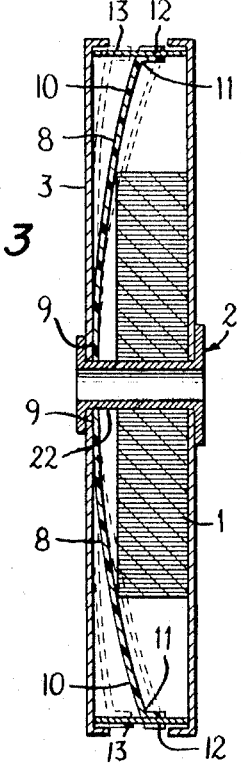
FIGURE 3 is a schematic view in diametrical cross-section of a third embodiment of an instrument according to the invention.

Reference is now made to FIGURE 3 which shows a modification of the invention, the same reference characters referring to the same elements.

The casing or frame 3 holds tape 1 which is wound with its coils close together on drum 2. The brake according to the invention comprises at least one branch 8 of flexible material, for example, of synthetic material.

The various branches 8 can have a common central part 9 perforated by a hole for mounting on the shaft 22 of drum 2, the outer end 10 of each branch 8 being free. This end 10 can advantageously be bent over tape 1 as shown at 11 and can have on this bent portion 11 a traversing groove 12 which accommodates cross-piece 13 of frame 3 thus preventing the turning of branches 8 of the braking device and limiting the play of ends 10 with respect to the casing.

There have been shown in dotted lines various positions of the branches 8 depending on the extent of unwinding of tape 1 and as it will be noted, branches 8 in every case bear on the edge of the last coils of tape 1.

The making of branches 8 of synthetic material, such as acetal resins such as those sold under the trademark of "Delrin" or in superpolyamide such as those sold under the name of "nylon" makes possible a sufficiently efficient braking without risk of damaging the tape.

There is thus provided a portable linear measuring instrument with a metallic tape wound on a drum in which the last coils are efficiently braked.

Figure 5:
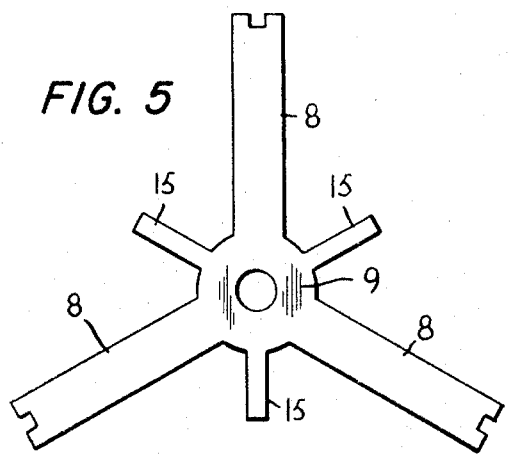
FIGURE 5 shows in cross-section the device of FIGURE 4.
Figure 4:
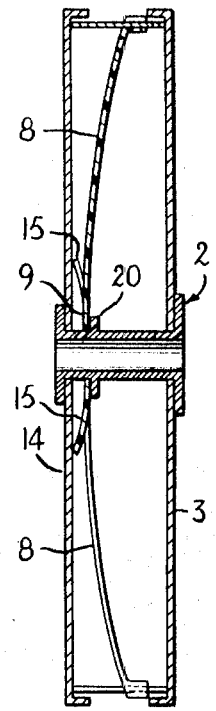
FIGURE 4 shows in plan view a braking device for the coils combined with a braking device for the drum.

Reference is made to FIGURES 4 and 5.

As a modification, the common central part 9 of branches 8 bears elastically on side 14 of casing 3 to brake drum 2 by pushing branches 8 and to avoid its unwanted turning. For this purpose, central part 9 can be provided with elastic branches such as 15 which bear on side 14 and urge said central part 9 and has branches 8 against a small flange 20 on the shaft of drum 2. These branches can be made of steel or of suitable synthetic material.

Figure 6:
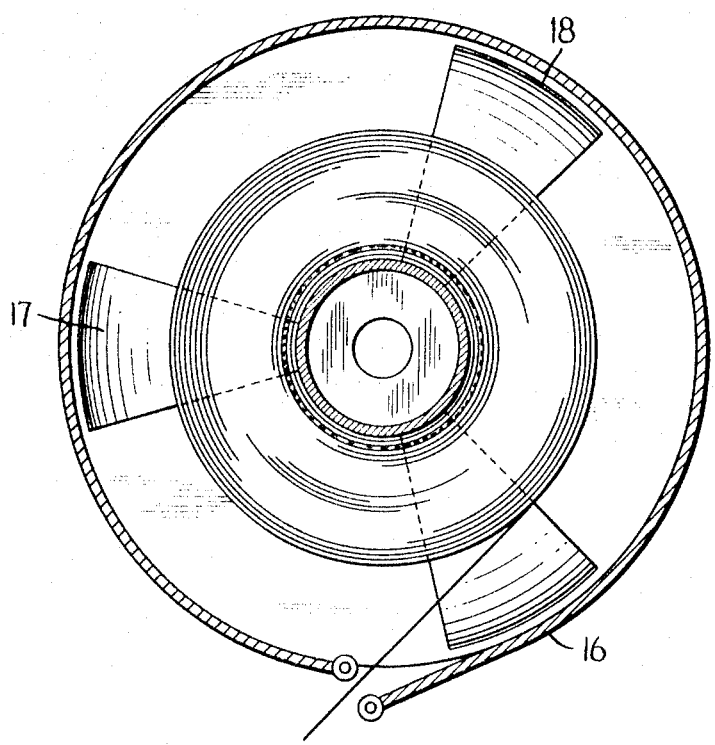
FIGURE 6 is a schematic view of a modification of the invention designed for an instrument having a closed casing.
Figure 7:
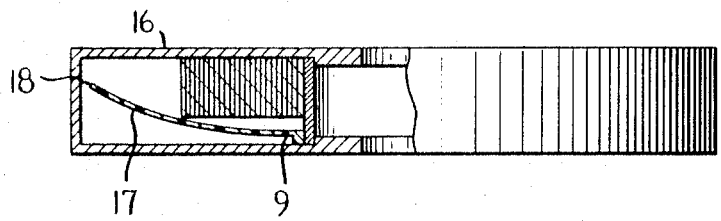
FIGURE 7 is a side view of the modification shown in FIGURE 6. It is understood that the casings of all these modifications have outlets for extracting the tape.

Reference is made to FIGURES 6 and 7. In the case of an enclosed casing such as 16 there can be used instead of branches such as 8 branches 17 which do not have an upper bent back part 11 nor a groove 12. The extremity 18 of each branch 17 preferably has a shape corresponding to the shape of the periphery of casing 16. Evidently, the central part 9 of branches 17 can be provided with branches 15 as previously described.

It will be understood that any other elastic pressure device without or with a central part 9 can be used in order to urge the central part 9 against drum 2. There is thus obtained, in an economical manner, a double brake acting on the one hand on the last wound coils and on the other hand on the winding drum.

Although the invention has been described with respect to particular embodiments thereof, it will be understood that the same is in no way limited thereto and that there can be brought to it various modifications of shapes and materials without thereby departing from the framework and scope of the invention.

What is claimed is:

1. A linear measuring instrument comprising a case having walls and an outlet therein, a drum with a shaft integral therewith mounted in said case, a tape coiled about said drum; and braking means comprising an inwardly curved resilient member fixedly mounted lengthwise of said casing and engaging the edge of the outer coil of said tape, said engagement being maintained by elastic deformation of said resilient member upon displacement of said outer coil of said tape by winding or unwinding of said tape, said resilient member having a plurality of arms symmetrically disposed and providing surfaces in contact with said edge of said outer coil.

2. Instrument according to claim 1, wherein said shaft has a flange lying within said case near one wall thereof and said resilient member is freely mounted on said shaft intermediate said wall and said flange but not rotatable with said shaft, said member having a plurality of arched resilient arms, at least some of said arms being arranged to press against said outer coil, the others of said arms being bent against said wall to exert braking pressure against said drum.

3. Instrument according to claim 1, wherein said case has cross pieces and said arms have a slot at their extremity for allowing passage of said cross pieces and thereby securing said member in place.

4. Instrument according to claim 1, additionally having a pair of bearing means mounted near said outlet on both sides of said tape.

5. Instrument according to claim 1, wherein at least one of said surfaces is resiliently urged against one side of said tape.

References Cited

UNITED STATES PATENTS

| 348,805 | 9/1886 | Wheeler | 242—84.8 |
| 1,423,516 | 7/1922 | Dieckmann | 242—99 |
| 1,992,947 | 3/1935 | Hayward | 33—138 |
| 2,110,210 | 3/1938 | Evans | 242—84.8 X |
| 2,230,668 | 2/1941 | Ohrtmann | 33—138 |
| 2,599,320 | 6/1952 | Dart | 242—107.3 |
| 2,636,694 | 4/1953 | Evans | 242—107.2 |
| 2,893,656 | 7/1959 | Carlson | 242—84.8 |
| 3,041,004 | 6/1962 | Busch | 242—107.3 |
| 3,224,705 | 12/1965 | Nash | 242—105 |

FOREIGN PATENTS

| 44,680 | 12/1938 | Netherlands. |

MERVIN STEIN, Primary Examiner

WERNER H. SCHROEDER, Assistant Examiner

U.S. Cl. X.R.

242—156.1